(12) United States Patent
Otani

(10) Patent No.: US 8,375,111 B2
(45) Date of Patent: *Feb. 12, 2013

(54) METHOD AND APPARATUS FOR HBA MIGRATION

(75) Inventor: Toshio Otani, Sunnyvale, CA (US)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/162,766

(22) Filed: Jun. 17, 2011

(65) Prior Publication Data

US 2011/0283026 A1    Nov. 17, 2011

Related U.S. Application Data

(63) Continuation of application No. 12/099,080, filed on Apr. 7, 2008, now Pat. No. 7,991,860.

(51) Int. Cl.
*G06F 15/177* (2006.01)
(52) U.S. Cl. .................................. 709/221; 709/220
(58) Field of Classification Search .......... 709/220–226; 370/216–228, 396–399; 714/4–7
See application file for complete search history.

(56) References Cited

U.S. PATENT DOCUMENTS

| | | | |
|---|---|---|---|
| 6,260,120 B1 | 7/2001 | Blumenau et al. | |
| 6,343,324 B1 | 1/2002 | Hubis et al. | |
| 7,260,636 B2 | 8/2007 | Blumenau et al. | |
| 7,415,535 B1 | 8/2008 | Kuik et al. | |
| 7,577,688 B2 | 8/2009 | Goldick et al. | |
| 7,606,239 B2 | 10/2009 | Maveli et al. | |
| 7,672,226 B2 * | 3/2010 | Shea | 370/217 |
| 7,673,071 B2 | 3/2010 | Baldwin et al. | |

(Continued)

FOREIGN PATENT DOCUMENTS

| | | |
|---|---|---|
| JP | 2005208971 | 8/2005 |
| JP | 2006011932 | 1/2006 |

(Continued)

OTHER PUBLICATIONS

J. Hufferd, et al., "Ethernet Switch ACLs for FCoE", http://www.t11.org/ftp/t11/pub/fc/bb-5/07-656v0.pdf, Brocade Communications Systems, Inc., 2007.

(Continued)

*Primary Examiner* — Brendan Higa
(74) *Attorney, Agent, or Firm* — Procopio, Cory, Hargreaves & Savitch, LLP

(57) ABSTRACT

In one implementation, a system includes multiple SCSI nodes configured to perform a SCSI target function. Each of the multiple SCSI nodes includes a host bus adaptor configured to connect the SCSI node with a Fiber Channel fabric. The host bus adaptor being assigned a world wide name and a network address. The system further includes a host configured to perform a SCSI initiator function. The world wide name assigned to a source host bus adaptor associated with one SCSI node is relocated to a target host bus adaptor associated with another SCSI node. After that, the network address associated with the source host bus adaptor is relocated to the target host bus adaptor. In one implementation, the system determines whether or not a network address assigned to a source host bus adaptor associated with one of the multiple SCSI nodes is shared with at least one other service. If so, the system determined whether the shared network address can be relocated to a target host bus adaptor associated with another one of the multiple of SCSI nodes. If the latter determination is in affirmative, the world wide name and network address are relocated.

14 Claims, 20 Drawing Sheets

U.S. PATENT DOCUMENTS

| | | | |
|---|---|---|---|
| 7,730,210 B2 * | 6/2010 | Kuik et al. | 709/245 |
| 7,970,873 B2 * | 6/2011 | Nguyen et al. | 709/221 |
| 2002/0083339 A1 | 6/2002 | Blumenau et al. | |
| 2003/0126242 A1 * | 7/2003 | Chang | 709/222 |
| 2003/0182427 A1 | 9/2003 | Halpern | |
| 2004/0151188 A1 | 8/2004 | Maveli et al. | |
| 2005/0246568 A1 | 11/2005 | Davies | |
| 2006/0101211 A1 | 5/2006 | Baldwin et al. | |
| 2006/0130052 A1 | 6/2006 | Allen et al. | |
| 2006/0230220 A1 | 10/2006 | Yasuda et al. | |
| 2007/0112974 A1 | 5/2007 | Shirogane et al. | |
| 2007/0233825 A1 | 10/2007 | Brownell et al. | |
| 2008/0101351 A1 * | 5/2008 | Nguyen et al. | 370/389 |
| 2008/0201458 A1 | 8/2008 | Salli | |
| 2009/0006493 A1 | 1/2009 | Draper et al. | |
| 2009/0307761 A1 | 12/2009 | Iyoda | |

FOREIGN PATENT DOCUMENTS

JP    2006293460    10/2006

OTHER PUBLICATIONS

European Search Report for Application No. 08017980.7 dated Sep. 25, 2009.

* cited by examiner

METHOD AND APPARATUS FOR HBA MIGRATION

CROSS-REFERENCE TO RELATED APPLICATION

This is a Continuation Application of U.S. application Ser. No. 12/099,080 filed Apr. 7, 2008. The entire disclosure of the prior application is incorporated herein by reference.

DESCRIPTION OF THE INVENTION

1. Field of the Invention

This invention generally relates to storage technology and more specifically to techniques for host bus adaptor (HBA) migration.

2. Description of the Related Art

Fibre Channel Protocol (FCP) is one of the popular network protocols for building a storage area network (SAN). Host computers with SCSI initiator function and disk arrays with SCSI target function can be connected with each other via SAN using FCP. Each node interconnected via the FCP incorporates a Host Bus Adaptor (HBA). HBA is a physical network port connected to SAN. HBA has an associated WWN (World Wide Name), which is a unique identifier used to interconnect multiple nodes into the SAN.

The legacy specification of the FCP stipulates that WWN on the HBA cannot be modified and moved to another HBA. For example, WWN_A on HBA_A cannot be moved to another HBA_B. Additionally, each HBA is permitted to have only one WWN and, therefore, cannot have multiple WWNs. However, newer extensions of the FCP have also been developed. Specifically, NPIV (N_Port ID Virtualization) extension of the FCP eliminates the aforesaid constraints. The NPIV extension allows one HBA to hold multiple WWNs, and a WWN can be moved to other HBAs. For example, WWN_A on HBA_A can be moved on other HBA_B (in this case, HBA_A will be assigned other WWN like WWN_X to avoid duplication of WWNs). With the aforesaid NPIV, if HBA failure occurs, one can sustain storage I/O connection to disk array without any re-configuration such as without reconfiguration of logical unit (LUN) security parameters. As it is well known to persons of skill in the art, LUN security configuration uses WWN to control the access to LU from SCSI Initiator.

Other extensions of FCP allow the FCP to be implemented based on Ethernet or IP. One such extension is called FC over Ethernet (FCoE) and another one is called FC over IP (FCIP). For example, the FCoE uses MAC address to establish connection to the Ethernet based SAN. MAC address is the unique identifier to connect multiple nodes in Ethernet. For example, HBA_A (HBA) has WWN_A (WWN) and MAC_A (MAC address). There is yet another similar protocol called iFCP. The above extensions permit one to develop Ethernet based FC SAN using less complicated Ethernet network switches. Such implementation of the FC SAN is less expensive than the traditional FC SAN implementation, which uses optical cable and specialized expensive FC switches.

If an HBA failure occurs in a conventional FC over Ethernet system, WWN_A on HBA_A will be automatically moved to another HBA_B by means of the NPIV mechanism. However, according to the conventional technology, the MAC address of the HBA_B remains the same and is not altered upon the transfer of the WWN. In this case, the connection between HBA_B and the disk array is established using the MAC address of HBA_B (not MAC_A of HBA_A). However, because the MAC address of the HBA_A is not transferred to HBA_B, the services that rely on MAC address of the HBA, as opposed to WWN, such as access control list (ACL), need to be reconfigured after the migration.

In particular, for security reasons, ACL is configured on the network port of the Ethernet switch. ACL restricts packet/frame transfer using network identifier such as MAC and IP address and, therefore, it relies on the MAC address and not the WWN. For example, connection between MAC_A and MAC_X from/to network port_A can be permitted, but connection between MAC_A and MAC_Y from/to network port_B can be denied by an exemplary ACL configured on Ethernet switch.

This means that one needs to configure individual ACL for each network port on Ethernet switch (ACL of network port_A and port_B will be different from each other). This will force the user to perform a large number configuration updates and result in a substantial downtime of the storage system. In addition, there is a possibility that WWN migration would result in a network access error. The same problem can result from the use of the FCIP. In case of the FCIP, the ACL incorporates not only MAC address, but also IP address.

Another problem is that re-connection of the FCP layer and the MAC layer occurs separately. Specifically, the FCP layer does not monitor the re-connection process of the MAC layer and the MAC layer does not monitor the re-connection process of the FCP layer. The FCP layer cannot establish connection before the re-connection of MAC layer. For example, if the re-connection of the MAC layer is not executed because one has not yet properly re-configured the Ethernet switch (but it will be done soon in the future), and the WWN migration is executed despite that fact, then the re-connection of FCP will not happen for some time and the above s condition will be reported as an error.

Thus, new techniques for migration of HBAs are needed.

SUMMARY OF THE INVENTION

The inventive methodology is directed to methods and systems that substantially obviate one or more of the above and other problems associated with conventional techniques for migration of HBAs.

In accordance with one aspect of the inventive concept, there is provided a computerized system including multiple SCSI nodes configured to perform a SCSI target function. Each of the multiple SCSI nodes includes a host bus adaptor provided to connect the SCSI node with a Fibre Channel fabric. The host bus adaptor is assigned a world wide name and a network address. The system further includes a host that is configured to perform a SCSI initiator function. At least one of the multiple nodes or the host is configured to cause the world wide name assigned to a source host bus adaptor associated with one of the multiple SCSI nodes to be relocated to a target host bus adaptor associated with another one of the multiple SCSI nodes. Moreover, at least one of the multiple nodes or the host is further configured to cause the network address assigned to the source host bus adaptor to be relocated to the target host bus adaptor.

In accordance with another aspect of the inventive concept, there is provided a computerized system including multiple SCSI nodes configured to perform a SCSI target function. Each of the multiple SCSI nodes includes a host bus adaptor provided to connect the SCSI node with a Fibre Channel fabric. The host bus adaptor is assigned a world wide name and a network address. The system further includes a host that is configured to perform a SCSI initiator function. At least one of the multiple nodes or the host is configured to determine whether or not the network address assigned to a source host bus adaptor associated with one of the multiple SCSI nodes is shared with at least one other service and, if so, if the shared network address can be relocated to a target host bus adaptor associated with another one of the multiple SCSI nodes and if it is determined that the shared network address can be relocated, to cause the world wide name assigned to the source host bus adaptor to be relocated to the target host bus adaptor and the shared network address assigned to the source host bus adaptor to be relocated to the target host bus adaptor.

In accordance with yet another aspect of the inventive concept, there is provided a method executed by a system including multiple SCSI nodes incorporating a SCSI target function. Each of the multiple SCSI nodes includes a host bus adaptor configured to connect the SCSI node with a Fibre Channel fabric, the host bus adaptor being assigned a world wide name and a network address; and a host incorporating a SCSI initiator function. The method involves relocating a world wide name assigned to a source host bus adaptor associated with one of the multiple SCSI nodes to a target host bus adaptor associated with another one of the multiple SCSI nodes; and relocating the network address assigned to the source host bus adaptor to the target host bus adaptor.

In accordance with a further aspect of the inventive concept, there is provided a method executed by a system including multiple SCSI nodes incorporating a SCSI target function. Each of the multiple SCSI nodes includes a host bus adaptor configured to connect the SCSI node with a Fibre Channel fabric, the host bus adaptor being assigned a world wide name and a network address; and a host incorporating a SCSI initiator function. The method involves determining whether or not a network address assigned to a source host bus adaptor associated with one of the multiple SCSI nodes is shared with at least one other service and, if so, if the shared network address can be relocated to a target host bus adaptor associated with another one of the multiple SCSI nodes; and if it is determined that the shared network address can be relocated, relocating the world wide name associated with the source host bus adaptor to the target host bus adaptor and the shared network address assigned to the source host bus adaptor to the target host bus adaptor.

In accordance with yet further aspect of the inventive concept, there is provided a method for assigning a virtual MAC address to a host bus adaptor (HBA) of a node. The inventive method involves receiving an address request from the node, the address request specifying a world wide name, the world wide name having been migrated to the node from a second node; verifying whether the world wide name has already been assigned the virtual MAC address; verifying whether the address request has come from a MAC address included into a MAC consistency group; and, if so, assigning the virtual MAC address, which has already been assigned to the world wide name.

In accordance with yet further aspect of the inventive concept, there is provided a method for proposing a virtual MAC address to a Fabric, the method being performed by a host bus adaptor (HBA) of a node. The inventive method involves: migrating a world wide name to the node from a second node; verifying whether the world wide name has already been assigned the virtual MAC address; verifying whether the virtual MAC address is included into a MAC consistency group; and if so, proposing the virtual MAC address, which has already been assigned to the world wide name.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Figure 1:
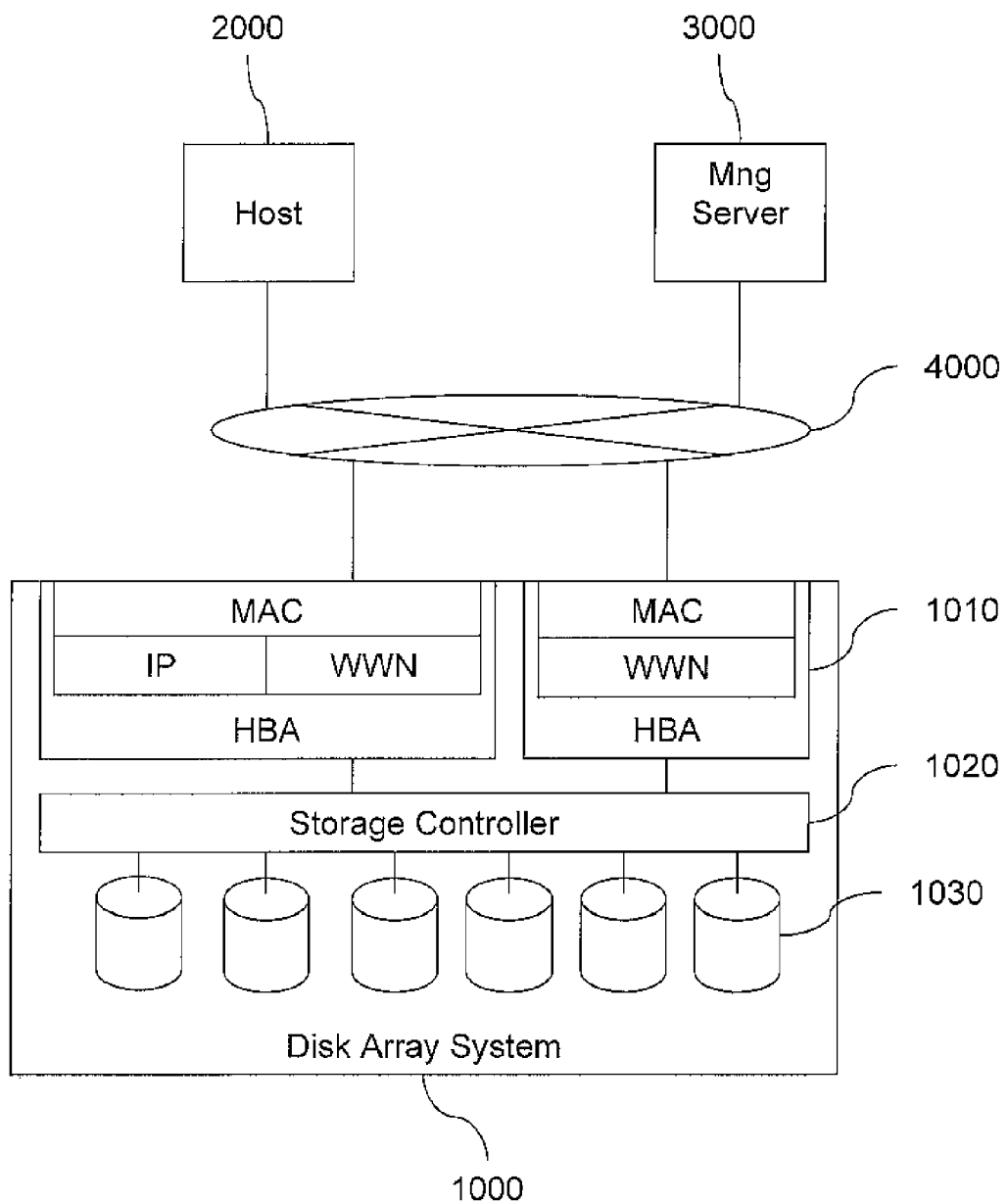
FIG. 1 illustrates an exemplary system configuration of an embodiment of the invention.
Figure 2:
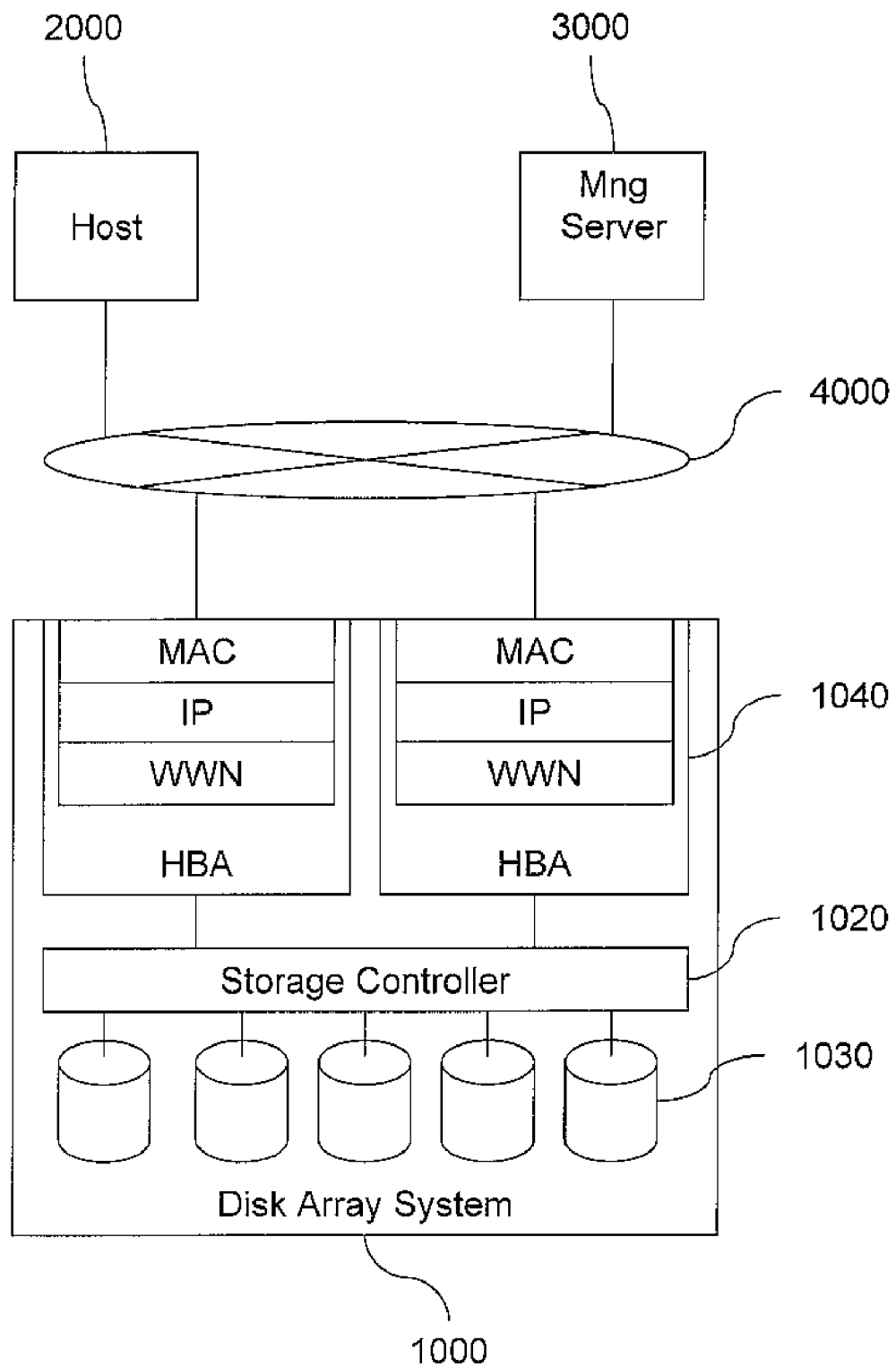
FIG. 2 illustrates an exemplary system configuration of an embodiment of the invention.

FIGS. 1 and 2 illustrate an exemplary system configuration of an embodiment of the invention. An exemplary embodiment of the inventive system may incorporate one or more of the following components: Disk Array System 1000; Host computer 2000; Management server 3000; and Ethernet/IP network 4000.

The Disk Array System 3000 incorporates a functionality of a SCSI target system. It may incorporate a Host Bus Adapter (HBA) 1010/1040, which handles network I/O operations, which may be performed under FCP and Ethernet protocols, a Storage controller 1020, which acts as a RAID (Redundant Arrays of Inexpensive Disks) controller handling disk I/O, and LU (Logical Unit) 1030, which is composed of multiple Hard Disk Drives (HDDs).

The Host computer 2000 incorporates a CPU, a memory, an HBA, as well as the other appropriate components (not shown) necessary for its operation. The Host computer 2000 runs an Operation System (OS) as well as various user applications. In one embodiment of the invention, the Host computer 2000 functions as a SCSI initiator. The Management server 3000 incorporates a CPU, a memory, an HBA as well as the other appropriate components (not shown) necessary for its operation. The Management server 3000 executes an Operation System (OS) as well as other applications. The Network 4000 incorporates an Ethernet switch, which is configured to transfer Ethernet frames from/to its network ports.

The HBA 1010/1040 is assigned a World Wide Name (WWN), a MAC address and an IP address, all of which are unique identifiers. These unique identifiers are used to interconnect multiple HBAs on the Ethernet network or Fibre Channel Protocol (FCP).

Exemplary Process of WWN/MAC/IP Migration

In accordance with an embodiment of the inventive concept, there are several situations when the MAC (and IP) address are migrated together with the WWN: 1: MAC (and IP) address and WWN migration completed; 2: WWN migration failure occur; 3: MAC (and IP) address migration failure occur; and 4: MAC (and IP) address and WWN migration completed, but FCP login failure.

Figure 3:
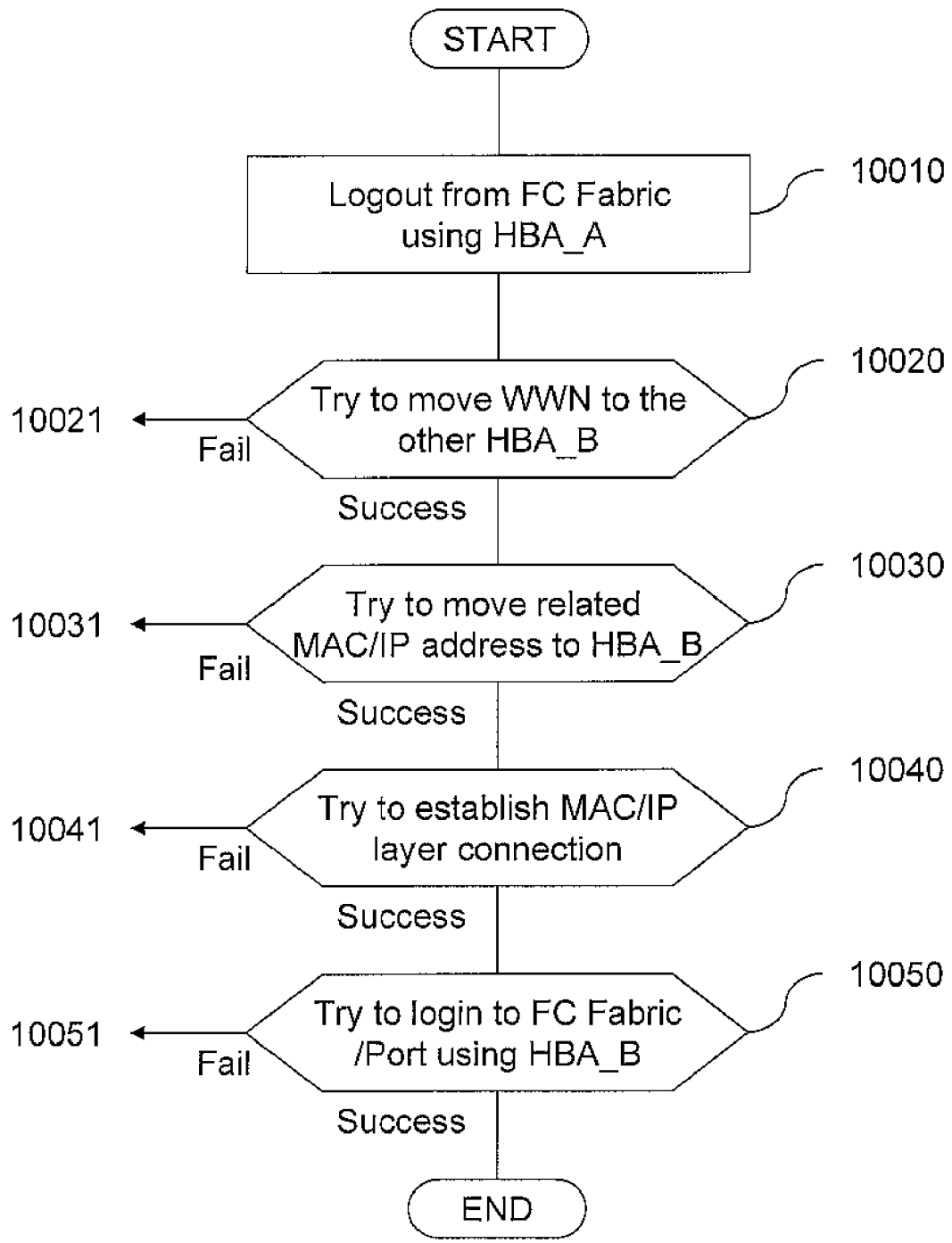
FIG. 3 illustrates an exemplary embodiment of a process for MAC (and IP) address migration together with WWN.

FIG. 3 illustrates an exemplary embodiment of a process for MAC (and IP) address migration together with WWN. First, the HBA_A logout from FC Fabric is performed using LOGO request (Step 10010). After that, the HBA_A attempts to move its WWN_A to another HBA_B (Step 10020). If the transfer of the WWN_A succeeds, HBA_A attempts to move its MAC (and IP) address (MAC_A, IP_A) to HBA_B (Step 10030). After the migration of the MAC_A (and IP_A) to HBA_B, the MAC address table of Ethernet switch and ARP table (Address Resolution Protocol (Mapping information of MAC address and IP address)) of other nodes must be updated accordingly. Therefore, the HBA_B waits for the update of this information. This update procedure can be implemented by sending a blank MAC frame to change information in the MAC address table and GARP (Gratuitous ARP) packet to change the information in the ARP table of each node (Step 10040). When MAC/IP layer network connection is established, HBA_B attempts to login to the FC Fabric/Port using FDISC/PLOGI requests (Step 10050).

Figure 4:
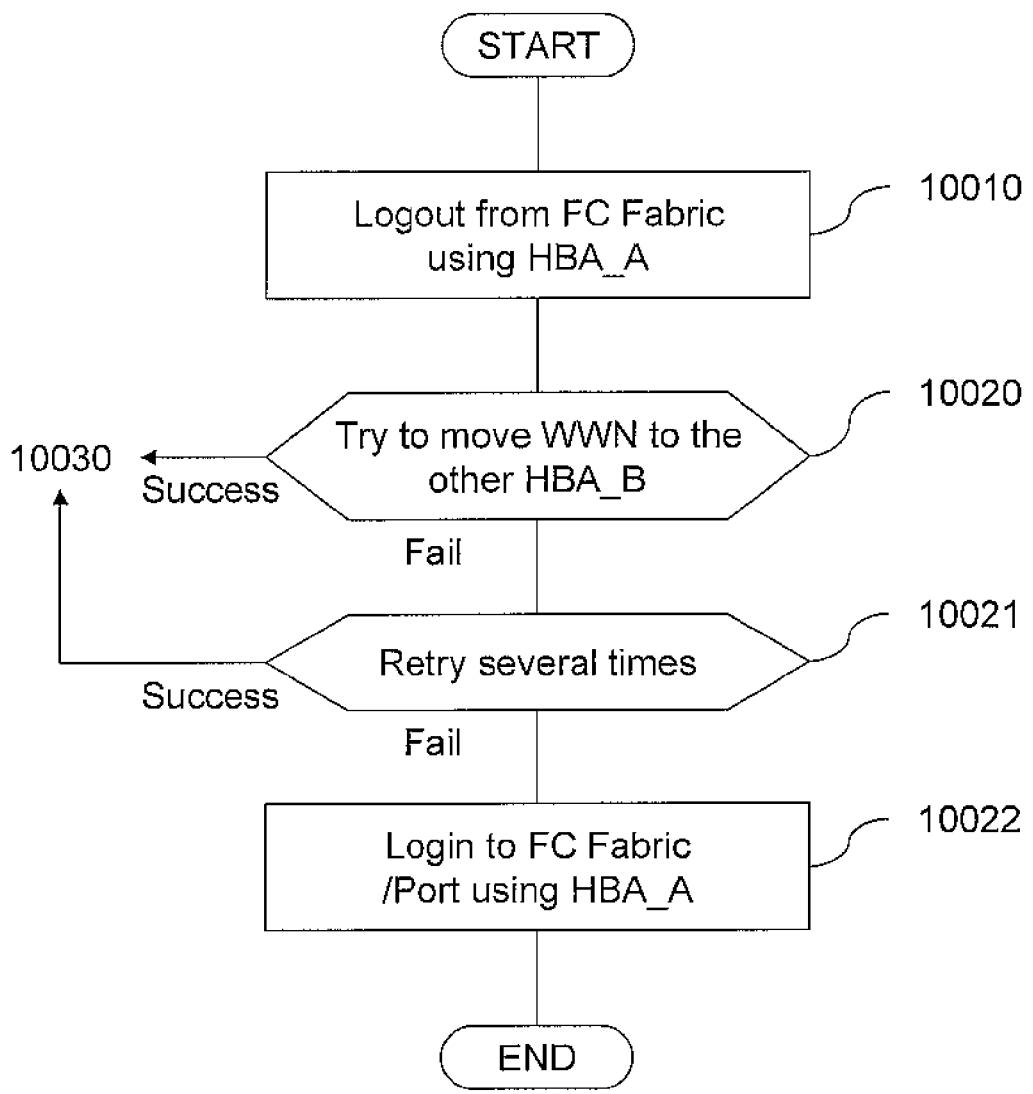
FIG. 4 illustrates an exemplary embodiment of a process for handling a failure at the Step 10020 (WWN migration) of the process shown in FIG. 3.

FIG. 4 illustrates an exemplary embodiment of a process for handling a failure at the Step 10020 (WWN migration) of the process shown in FIG. 3. If such failure occurs, the HBA_A repeats the WWN move attempt several times (Step 10021). When all attempts fail and the HBA_A determines that the WWN cannot be moved to the HBA_B, the HBA_A will give up on the WWN migration, and subsequently re-login to FC Fabric/Port using HBA_A (Step 10022).

Figure 5:
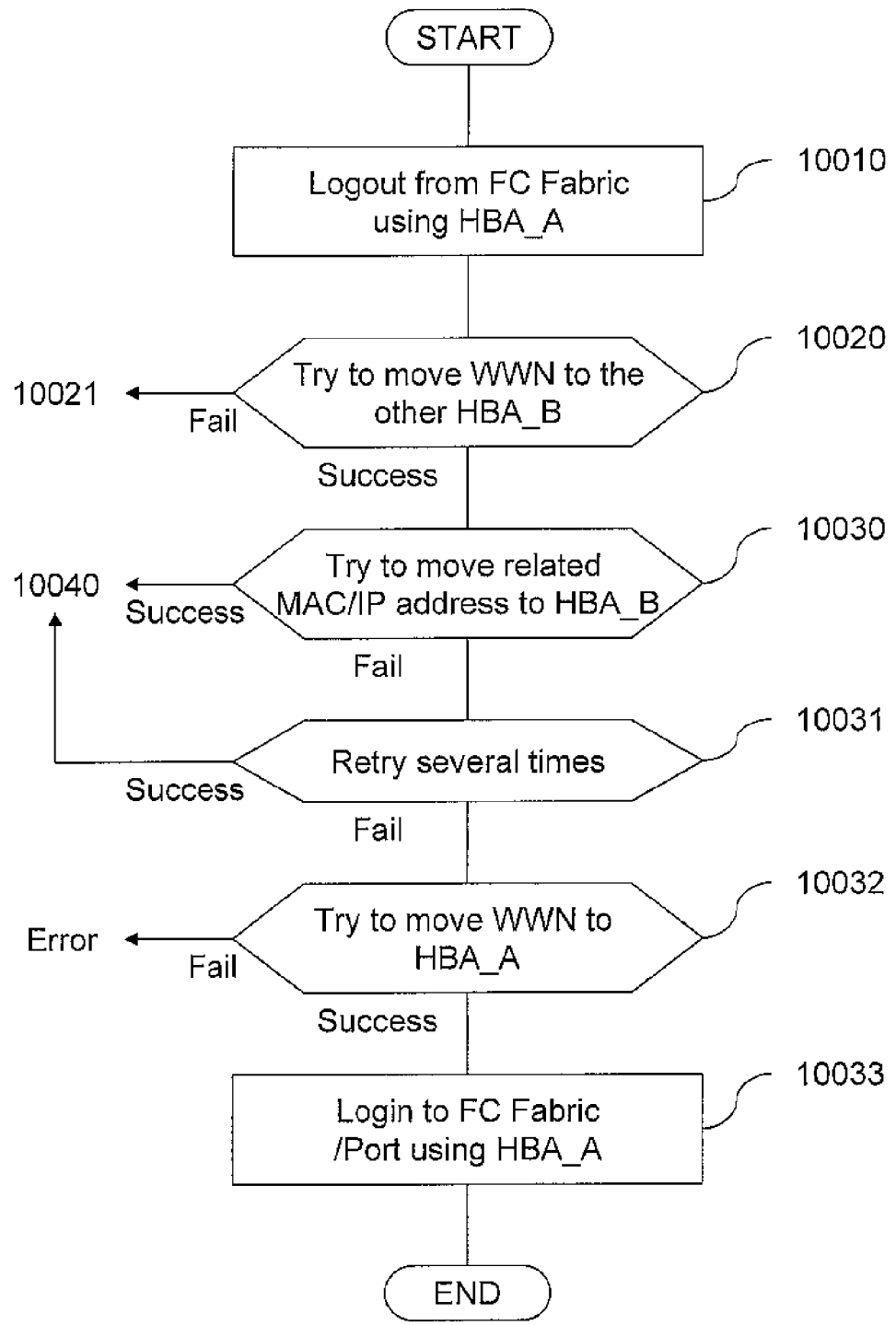
FIG. 5 illustrates an exemplary embodiment of a process for handling a failure at the Step 10030 (MAC (and IP) address migration) of the procedure shown in FIG. 3.

FIG. 5 illustrates an exemplary embodiment of a process for handling a failure at the Step 10030 (MAC (and IP) address migration) of the procedure shown in FIG. 3. If such failure occurs, the HBA_A repeats the MAC (and IP) address move attempt several times (Step 10031). When all attempts fail and the HBA_B determines that the MAC (and IP) address cannot be moved to the HBA_B, the HBA_A will give up on the MAC (and IP) address migration, and will subsequently attempt to return WWN_A on HBA_B to HBA_A (Step 10032). After that, the HBA_A logins to FC Fabric/Port, without migrating WWN to HBA_B (Step 10033).

Figure 6:
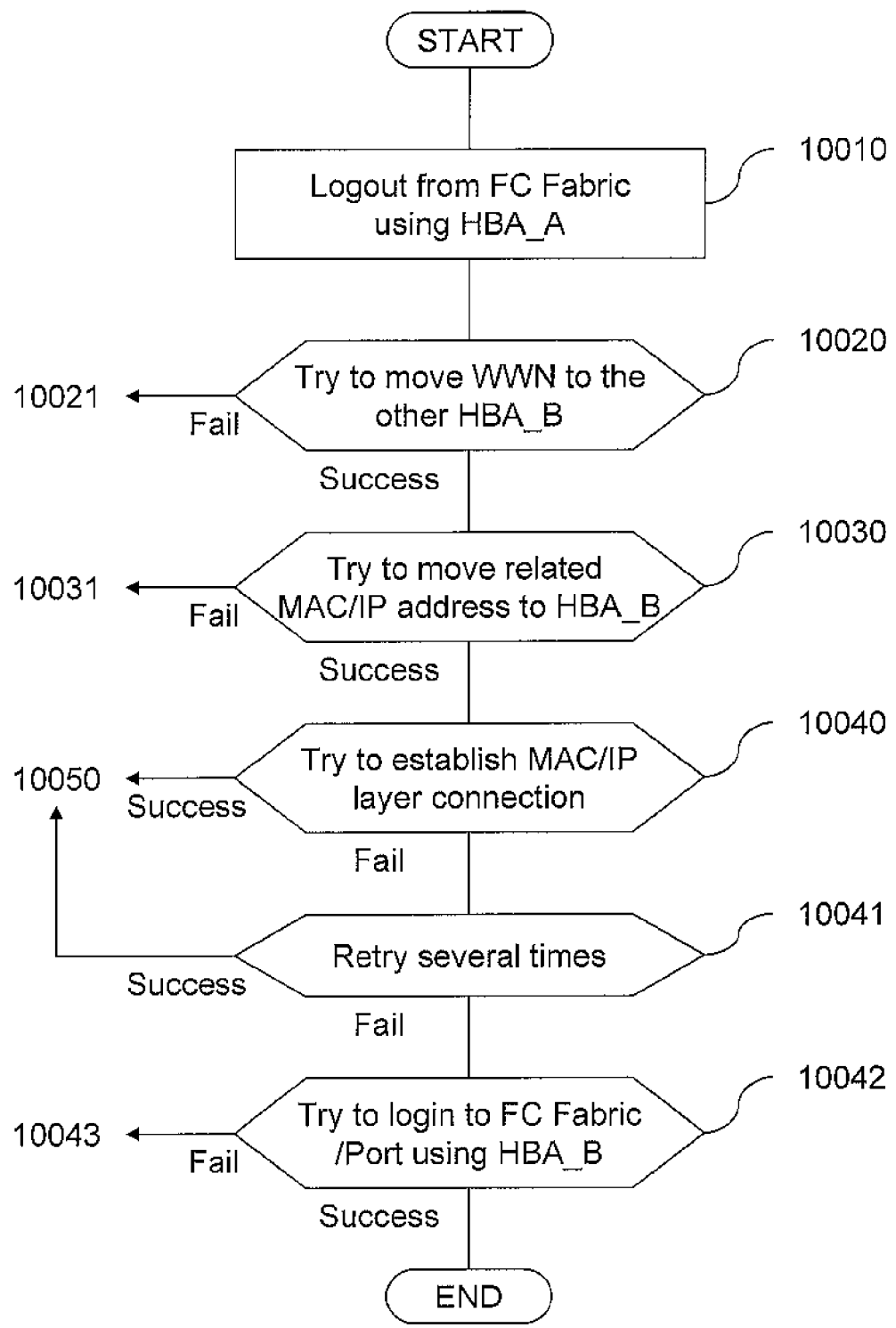
FIG. 6 illustrates an exemplary embodiment of a process for handling a failure at the Step 10040 (Updating MAC address table and/or ARP table) of the procedure shown in FIG. 3.
Figure 7:
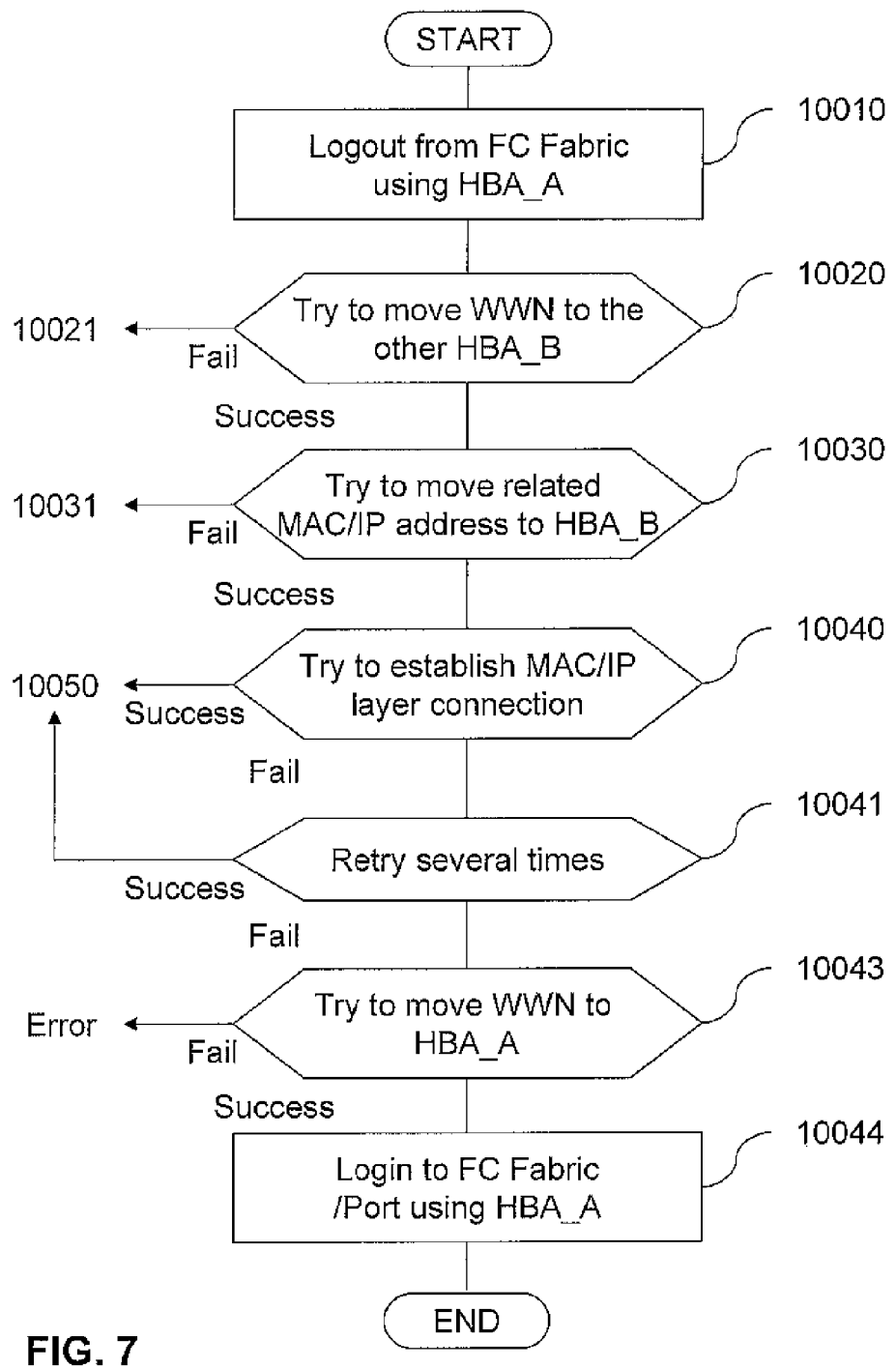
FIG. 7 illustrates another implementation of a process for handling a failure at the Step 10040 (Updating MAC address table and/or ARP table).

FIG. 6 illustrates an exemplary embodiment of a process for handling a failure at the Step 10040 (Updating MAC address table and/or ARP table) of the procedure shown in FIG. 3. If such failure occurs, the HBA_A and the HBA_B repeat the attempts to update the MAC address table and/or the ARP table several times (Step 10041). When all attempts fail and the MAC address table and/or the ARP table cannot be updated, the HBA_A and the HBA_B give up on the MAC (and IP) address migration. Subsequently, the HBA_B logins to the FC Fabric/Port using another MAC (and IP) address assigned to HBA_B (Step 10042). However, in this case, the MAC (and IP) address will be changed. FIG. 7 illustrates another implementation of this process. Before login into the FC Fabric/Port, the HBA_B tries to return the WWN_A on the HBA_B to the HBA_A (Step 10043). After that, the HBA_A logins into the FC Fabric/Port, without migrating the WWN to the HBA_B (Step 10044).

Figure 8:
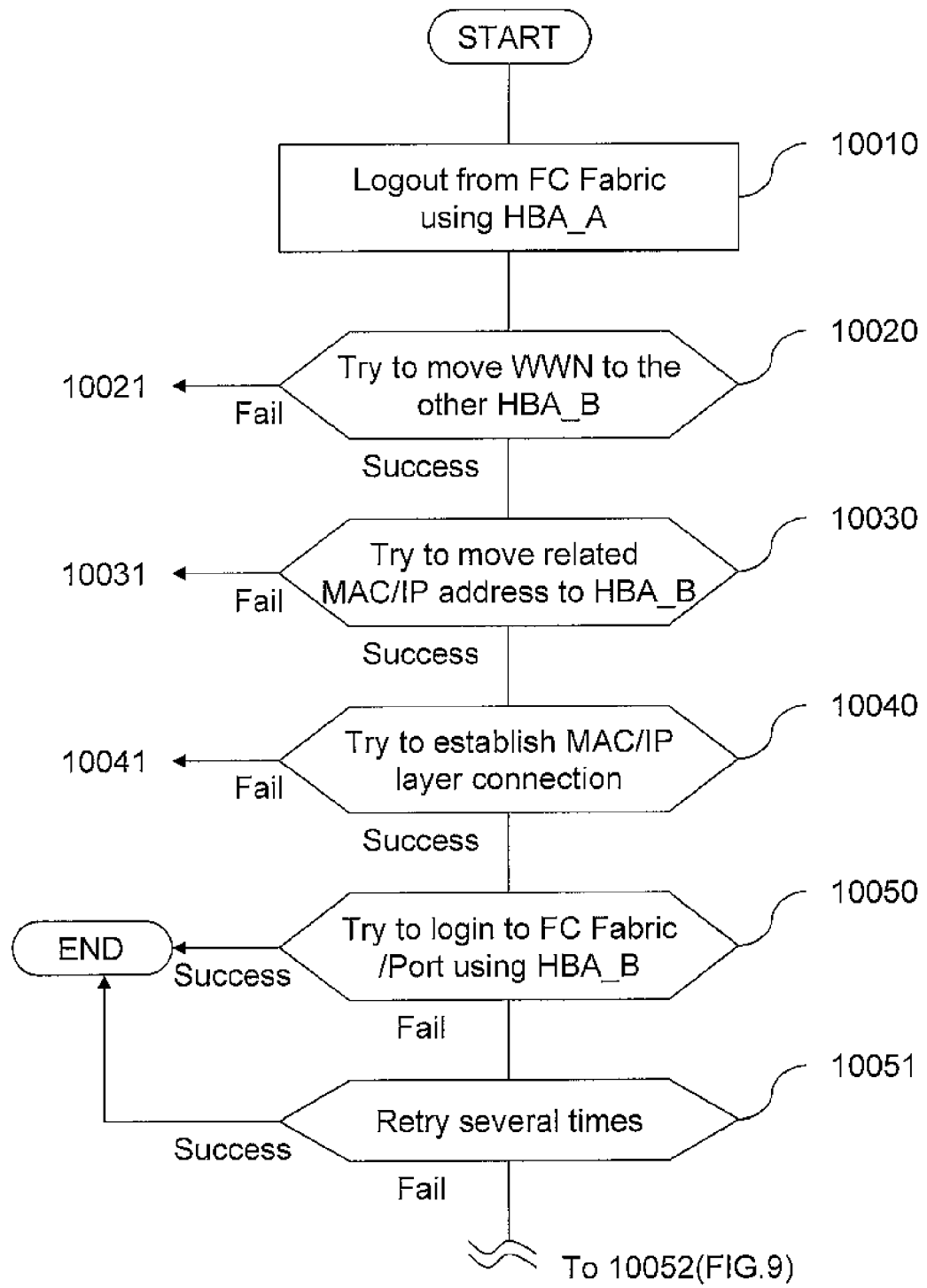
FIGS. 8 and 9 illustrate an exemplary embodiment of a process for handling a failure at the Step 10050 (Login to FC Fabric/Port using HBA_B) of the procedure shown in FIG. 3.
Figure 9:
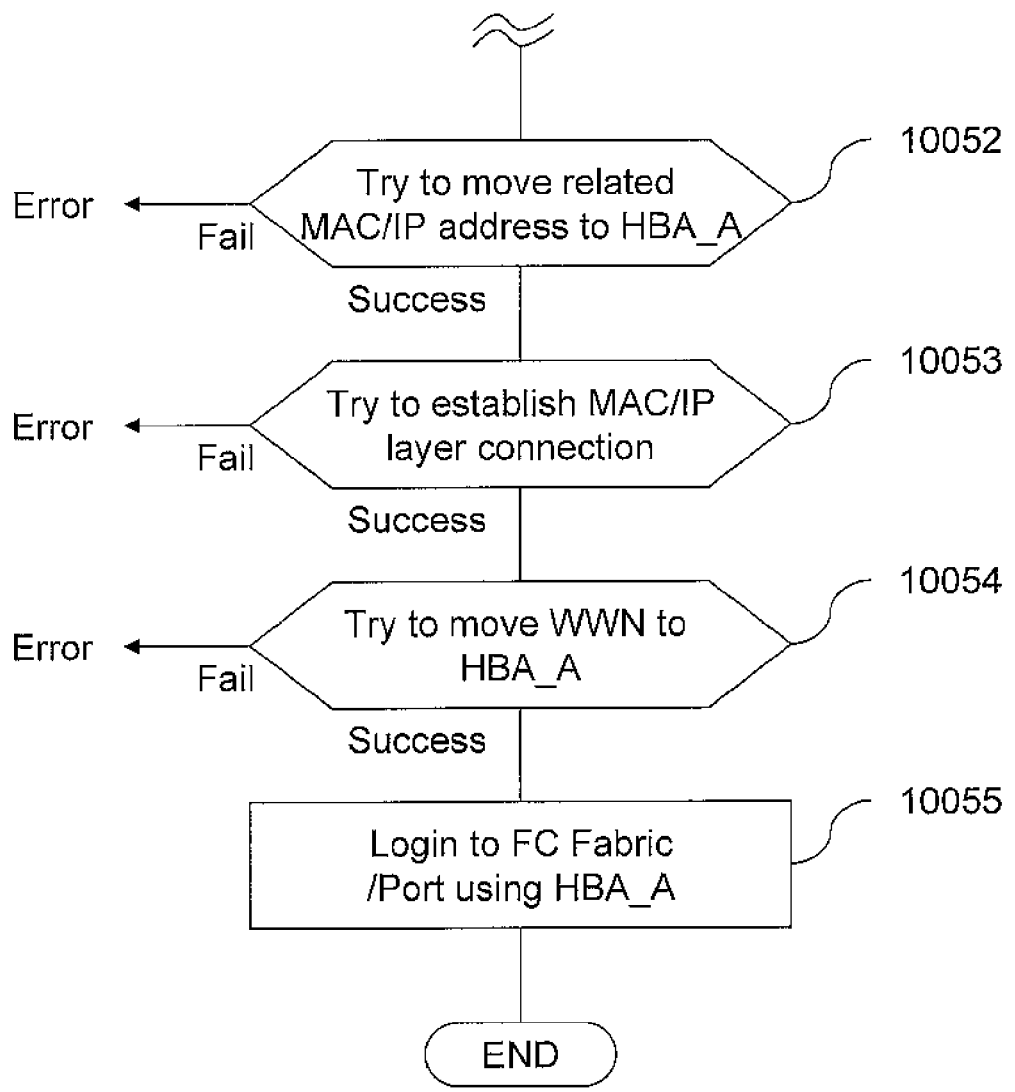

FIGS. 8 and 9 illustrate an exemplary embodiment of a process for handling a failure at the Step 10050 (Login to FC Fabric/Port using HBA_B) of the procedure shown in FIG. 3. If such failure occurs, the HBA_B repeats several times the re-login attempts to the FC Fabric/Port (Step 10051). When all the re-login attempts fail, the HBA_B gives up on the login procedure and subsequently attempts to return the related MAC (and IP) address and the WWN to the HBA_A (Step 10054). After that, the HBA_A logins into the FC Fabric/Port, without migrating WWN to HBA_B (Step 10055).

The above-described procedures can be executed by HBA, Computing Node (such as Disk Array System 1000, Host 2000, and Ethernet switch on network 4000. And Management server 3000 can coordinate these processes between plural components).

Process of WWN/MAC/IP Migration and Other Services

In accordance with an embodiment of the invention, when MAC (and IP) address can be shared between WWN (NPIV) and the other services such as iSCSI, one needs to determine whether or not this shared MAC (and IP) address can be migrated. There are several possible situations: 1: MAC address to be migrated is used by only WWN (NPIV); 2: MAC address to be migrated is shared by other services; and 3: MAC address to be migrated is used by other IP address.

Figure 10:
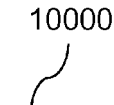
FIG. 10 illustrates an exemplary embodiment of a mapping table 10000 between Services (such as FCoE, iSCSI . . . ), IP address, MAC address and WWN.

FIG. 10 illustrates an exemplary embodiment of a mapping table 10000 between Services (such as FCoE, iSCSI . . . ), IP address, MAC address and WWN. For example, FCoE service uses MAC address 11:11:11:11:11:11 and WWN 10:10:10:10:10:10:10:11. FCoE service and iSCSI service share MAC address 22:22:22:22:22:22. Finally, the two FCoE services share MAC address 44:44:44:44:44:44.

Figure 11:
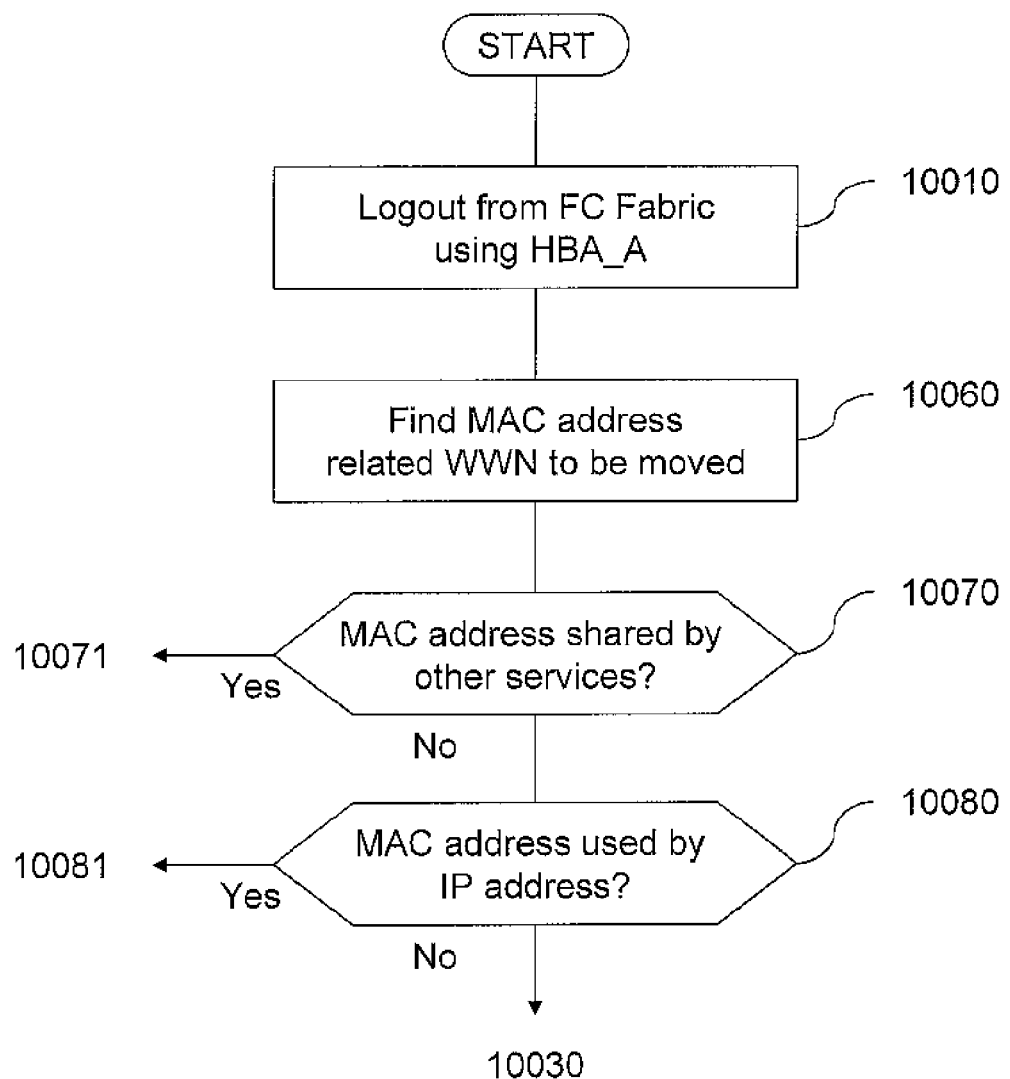
FIG. 11 illustrates an exemplary embodiment of the migration process corresponding to a situation in which the MAC address to be migrated is used by only one WWN (NPIV).

FIG. 11 illustrates an exemplary embodiment of the migration process corresponding to a situation in which the MAC address to be migrated is used by only one WWN (NPIV). After the Step 10010, described above, the HBA_A locates the MAC address associated with the WWN to be migrated (Step 10060). Next, the HBA_A attempts to locate other services sharing this MAC address using the mapping table 10000 (Step 10070). If there are no such other services, the HBA_A attempts to find an IP address associated with this MAC address from the mapping table 10000 (Step 10080). If there is no such IP address, the HBA_A proceeds to Step 10030 to migrate the WWN and the MAC address.

Figure 12:
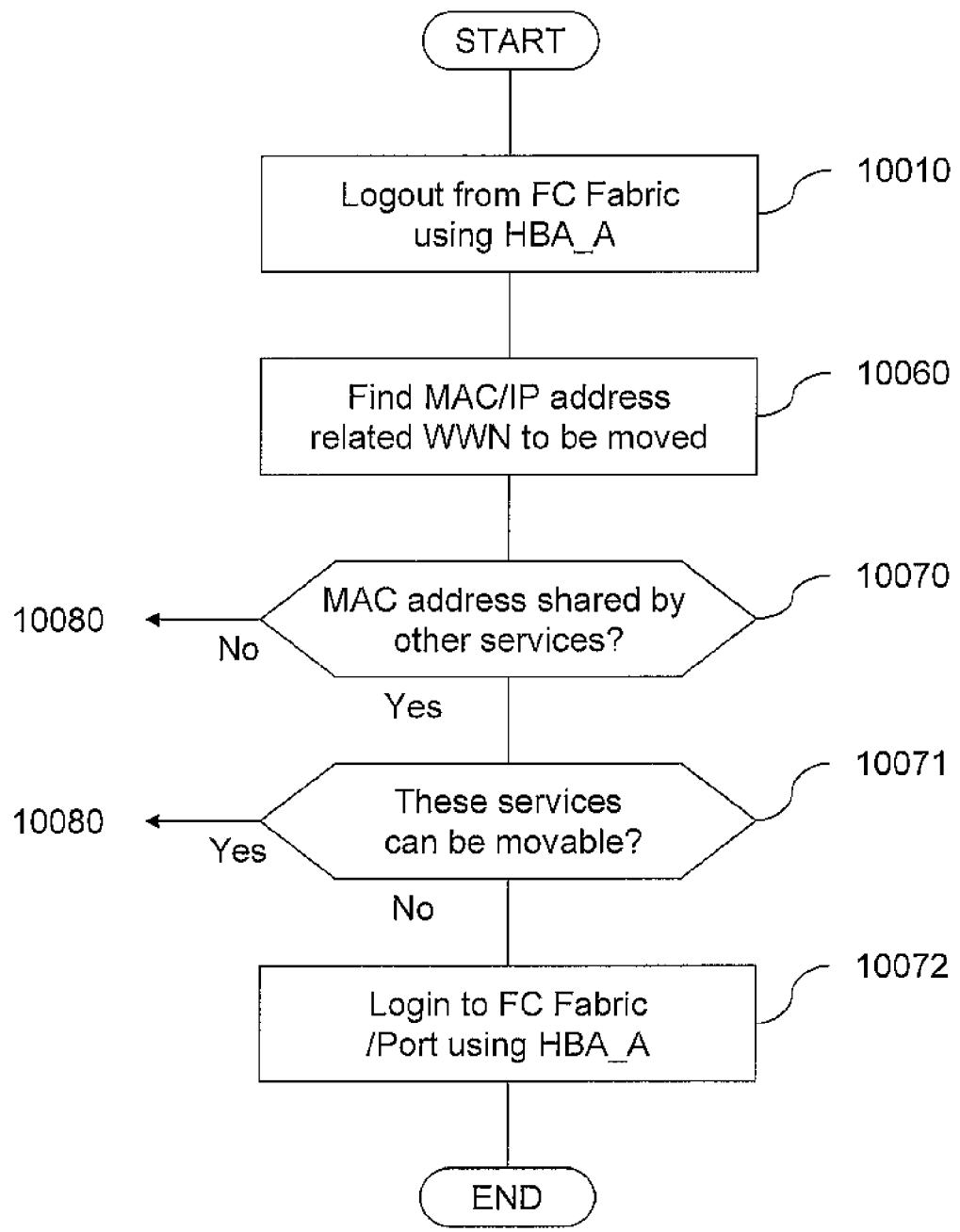
FIG. 12 illustrates an exemplary embodiment of the migration process corresponding to a situation in which the MAC address to be migrated is shared by other services (such as other WWN).

FIG. 12 illustrates an exemplary embodiment of the migration process corresponding to a situation in which the MAC address to be migrated is shared by other services (such as other WWN). In this case, the HBA_A first determines whether or not the other services sharing that MAC address are movable. For example, the mapping table 10000 has the information that indicates whether or not each service is movable (Step 10071). If the service is not movable, the HBA_A will login into the FC Fabric/Port, without migrating the WWN to the HBA_B (Step 10072).

Figure 13:
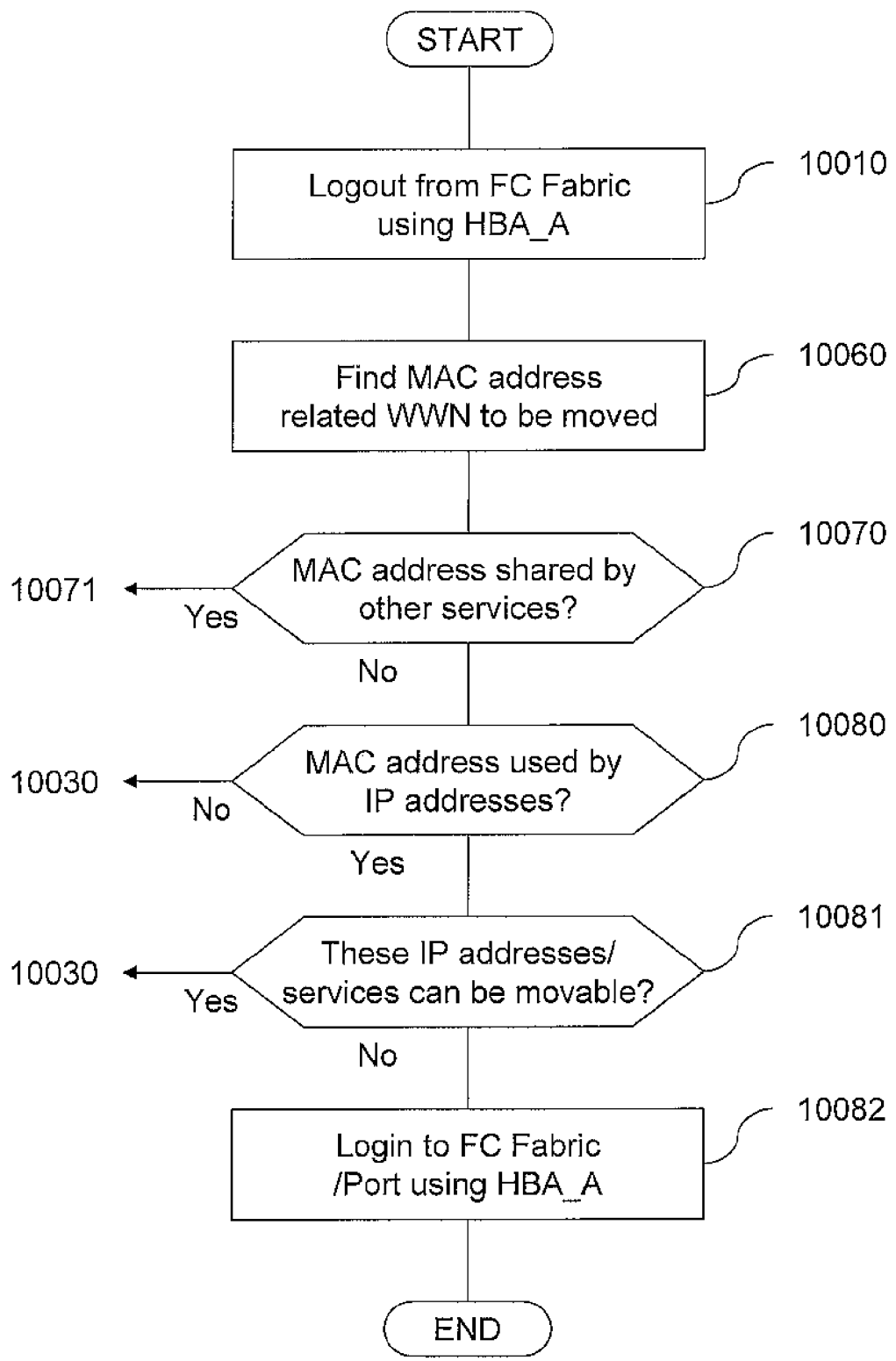
FIG. 13 illustrates an exemplary embodiment of the migration process corresponding to a situation in which the MAC address to be migrated is shared by other IP address(es).

FIG. 13 illustrates an exemplary embodiment of the migration process corresponding to a situation in which the MAC address to be migrated is shared by other IP address(es). In this case, the HBA_A determines whether or not this IP address(es) is movable. For example, the mapping table 10000 has the information that indicates whether or not each service can be moved (Step 10081). If the service is not movable, the HBA_A will login into the FC Fabric/Port, without migrating the WWN to the HBA_B (Step 10082). The above-described processes can be executed by HBA, Computing Node (such as Disk Array System 1000, Host 2000, and Ethernet switch on network 4000. And Management server 3000 can coordinate these processes between plural components).

Figure 14:
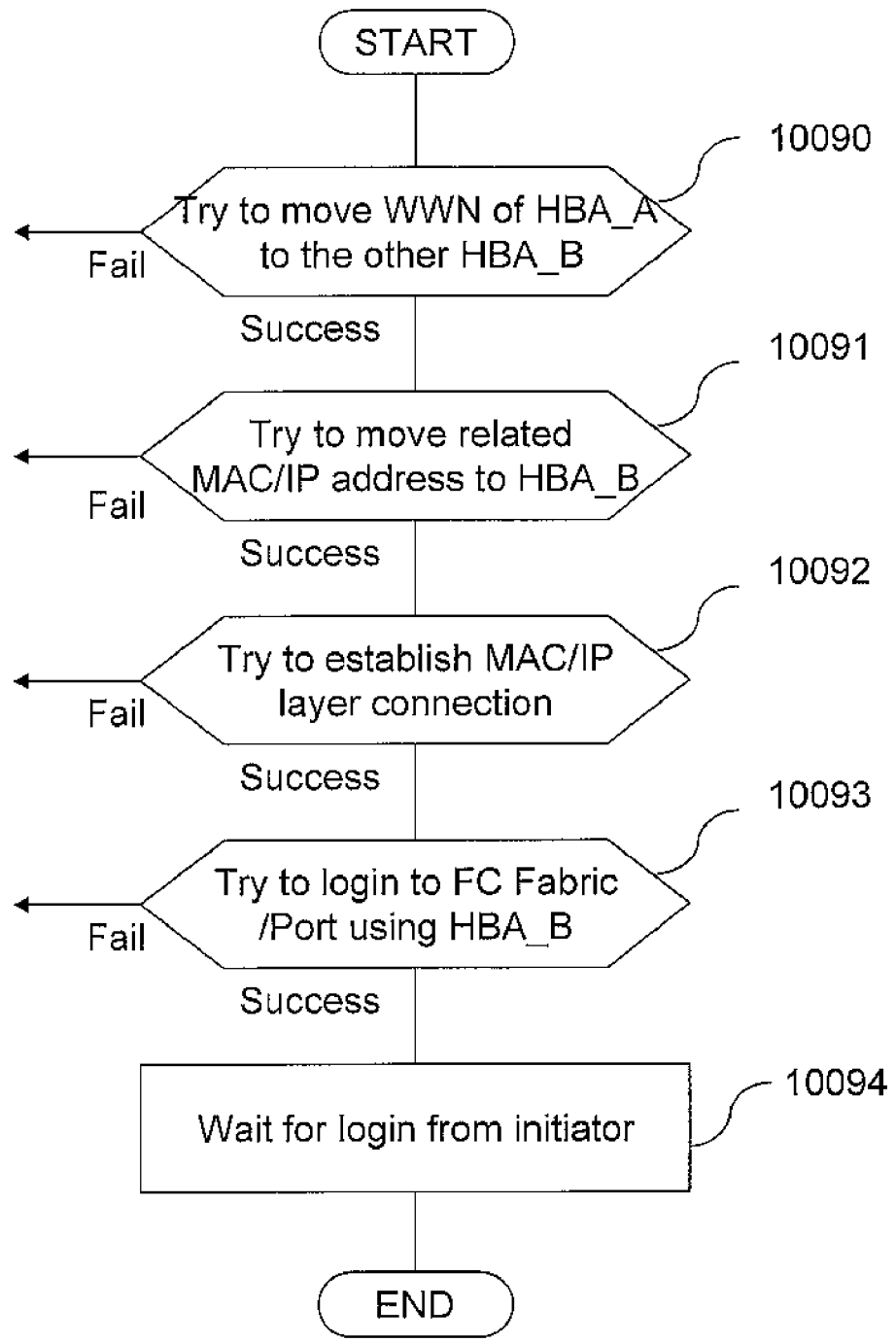
FIG. 14 illustrates an exemplary embodiment of the migration process corresponding to a configuration in which the device, which migrates the WWN and the MAC/IP, is a SCSI target device.

FIG. 14 illustrates an exemplary embodiment of the migration process corresponding to a configuration in which the device, which migrates the WWN and the MAC/IP, is a SCSI target device. As well know to persons of ordinary skill in the art, a target is the storage-device side endpoint of a SCSI session. SCSI initiators request data transfers from SCSI targets. SCSI targets are typically disk-drives, tape-drives, optical, or other media devices.

The procedure shown in FIG. 14 allows SCSI target to migrate MAC/IP address by the NPIV, described hereinabove. The procedure shown in FIG. 14 is slightly different from the above-described procedures corresponding to SCSI initiator devices. Specifically, if failure of HBA_A is detected, the SCSI target device will try to move its WWN to the other HBA_B, see step 10090. After that, at step 10091, the SCSI target device will try to migrate MAC/IP address to the HBA_B. At step 10092, the device will attempt to establish MAC/IP layer connection. Finally, at step 10093, it will try to login to FC Fabric and wait for the login access from the corresponding SCSI initiator.

In the above-described example, the SCSI initiator device will act as follows. When the failure of HBA_A of SCSI target, SCSI initiator will try to logout from this port. After logout procedure, it will try to re-login into the FC Fabric and get the SCSI target information. When the SCSI initiator device obtains SCSI target information (WWN on HBA_B), it will try to login to HBA_B.

The above-described embodiments of the inventive system can be adopted for a configuration wherein the MAC address is assigned statically into each of the multiple HBAs. However, in other system configurations, the MAC address used for storage I/O traffic can be assigned dynamically using Fabric Service such as FCoE.

Figure 15:
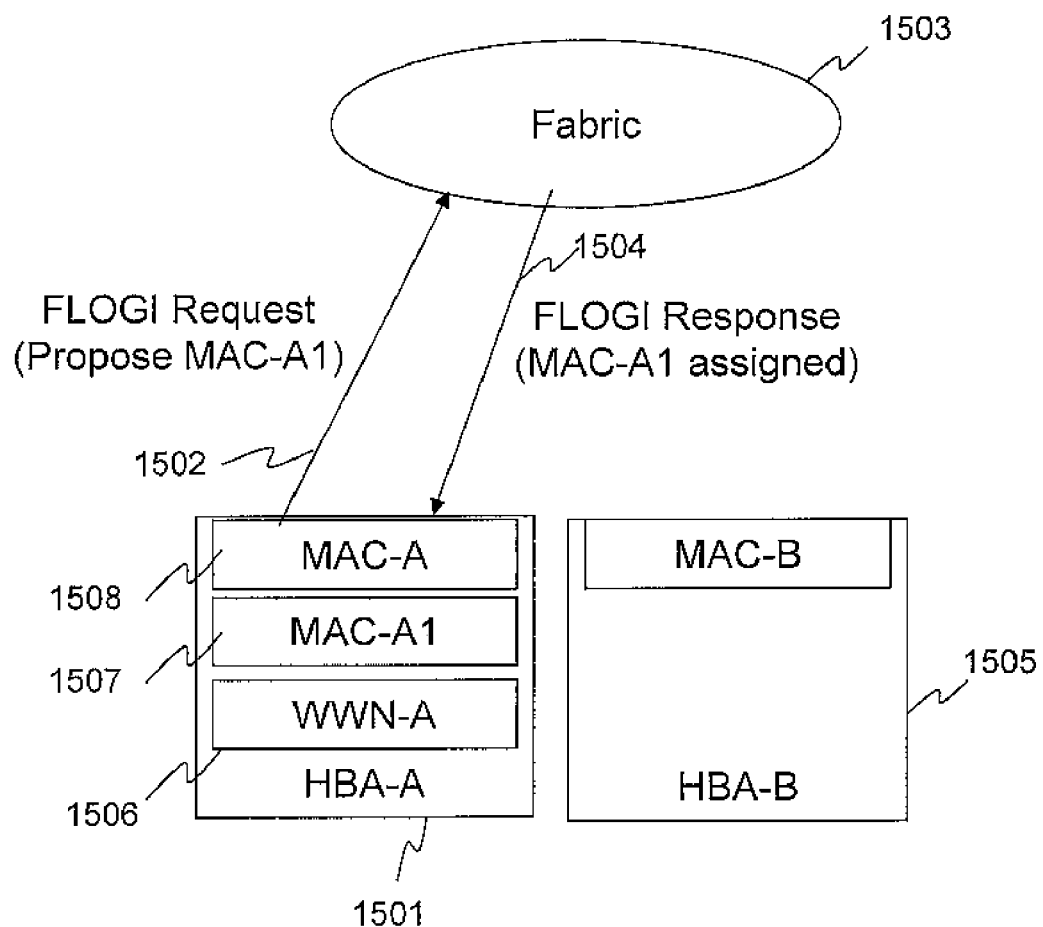
FIG. 15 illustrates one exemplary embodiment of the MAC address assignment mechanism corresponding to a configuration utilizing the FCoE.

FIG. 15 illustrates one exemplary embodiment of the MAC address assignment mechanism corresponding to a configuration utilizing the FCoE. When HBA-A 1501 sends FLOGI message 1502 to Fabric 1503 (this time, static MAC-A 1508 will be used), this message 1502 has WWN (WWN-A) 1506 and proposed MAC address (MAC-A1) 1507, which is Virtual MAC address for FCoE I/O traffic. Ordinary, proposed V-MAC address will be approved by Fabric by means of the FLOGI response message 1504. After this process, HBA A 1505 starts FCoE I/O communication with another node (for example, HBA-B 1505) by using V-MAC address.

Figure 16:
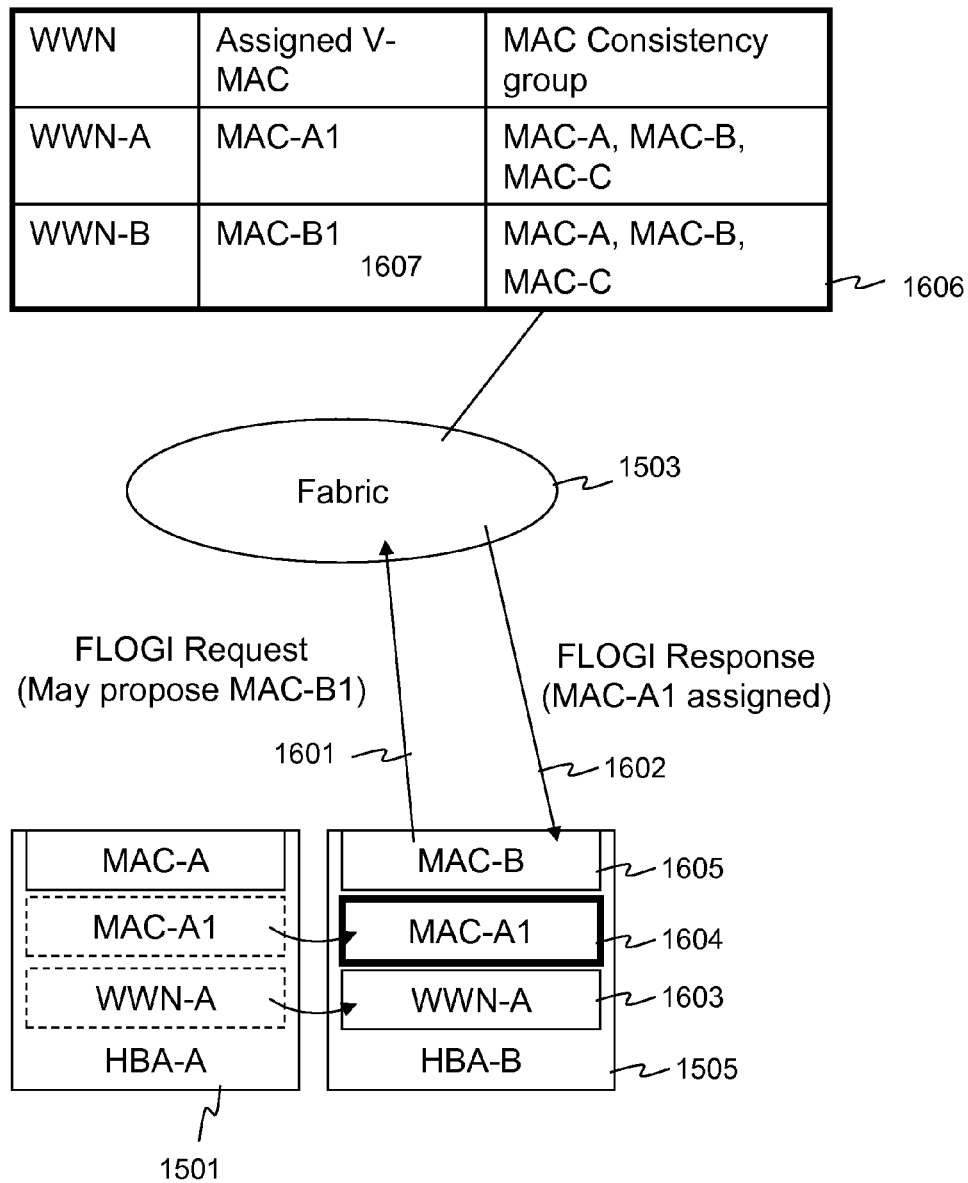
FIG. 16 illustrates an exemplary procedure for migrating WWN and V-MAC addresses.

FIG. 16 illustrates an exemplary procedure for migrating WWN and V-MAC addresses in the above configuration. When WWN-A 1603 is moved to HBA-B 1505, MAC-A1 1604 should be moved to HBA-B 1505, as well. However, when HBA-B 1505 sends FLOGI message 1601 to the Fabric 1503, it will propose the MAC-B1 address 1605. This request will let the Fabric 1503 assign MAC-B1 address to HBA-B 1505 and not MAC-A1. To prevent this, the Fabric 1503 incorporates a MAC Consistency Group Table 1606. It allows the Fabric 1503 to determine which MAC address should be assigned to the HBA when the FLOGI message 1601 comes in. For instance, the MAC-A1 address 1604 was assigned when the FLOGI of WWN-A occurred. The migration of the WWN-A 1501 will cause another FLOGI operation (1601, 1602) to be initiated from the HBA-B 1505. If new FLOGI message 1601 from the HBA-B 1505 comes to the Fabric 1503, the Fabric checks the source MAC address (MAC-B 1605) and WWN included FLOGI message 1601 (WWN-A 1603) and the MAC Consistency Group Table 1606. Because the WWN-A 1603 is already associated with MAC-A1 1604, the Fabric will assign MAC-A1 1604 to HBA-B 1505, instead of MAC-B1 1607.

Figure 17:
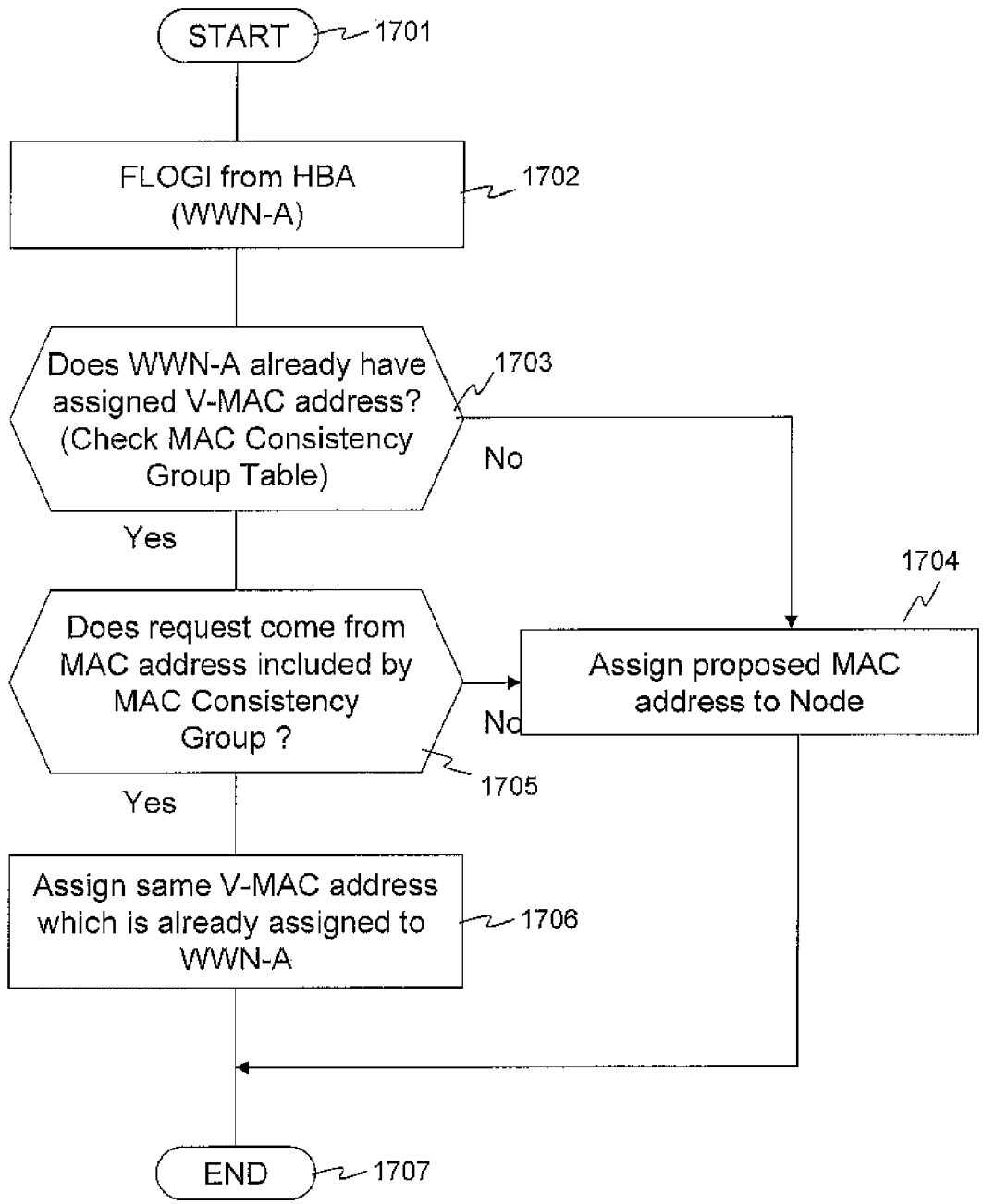
FIG. 17 illustrates an exemplary flowchart corresponding to the procedure for migrating WWN and V-MAC addresses.

FIG. 17 illustrates an exemplary flowchart corresponding to the above process. The operation of the process starts at step 1701. At step 1702, the Fabric 1503 receives a FLOGI request from the HBA associated with the WWN-A address. At step 1703, the Fabric checks the MAC Consistency Group Table 1606 whether WWN-A has already been assigned a V-MAC address. If so, the operation proceeds to step 1705. If no, the operation proceeds to step 1704. At step 1705, the Fabric checks whether the request came from an entity associated with a MAC address included in a MAC Consistency Group. If so, the Fabric assigns to the requestor the same V-MAC address, which has already been assigned to WWN-A. Otherwise, the operation proceeds to step 1704, whereupon the proposed MAC address is assigned to the requestor. The operation terminates at step 1707.

Figure 18:
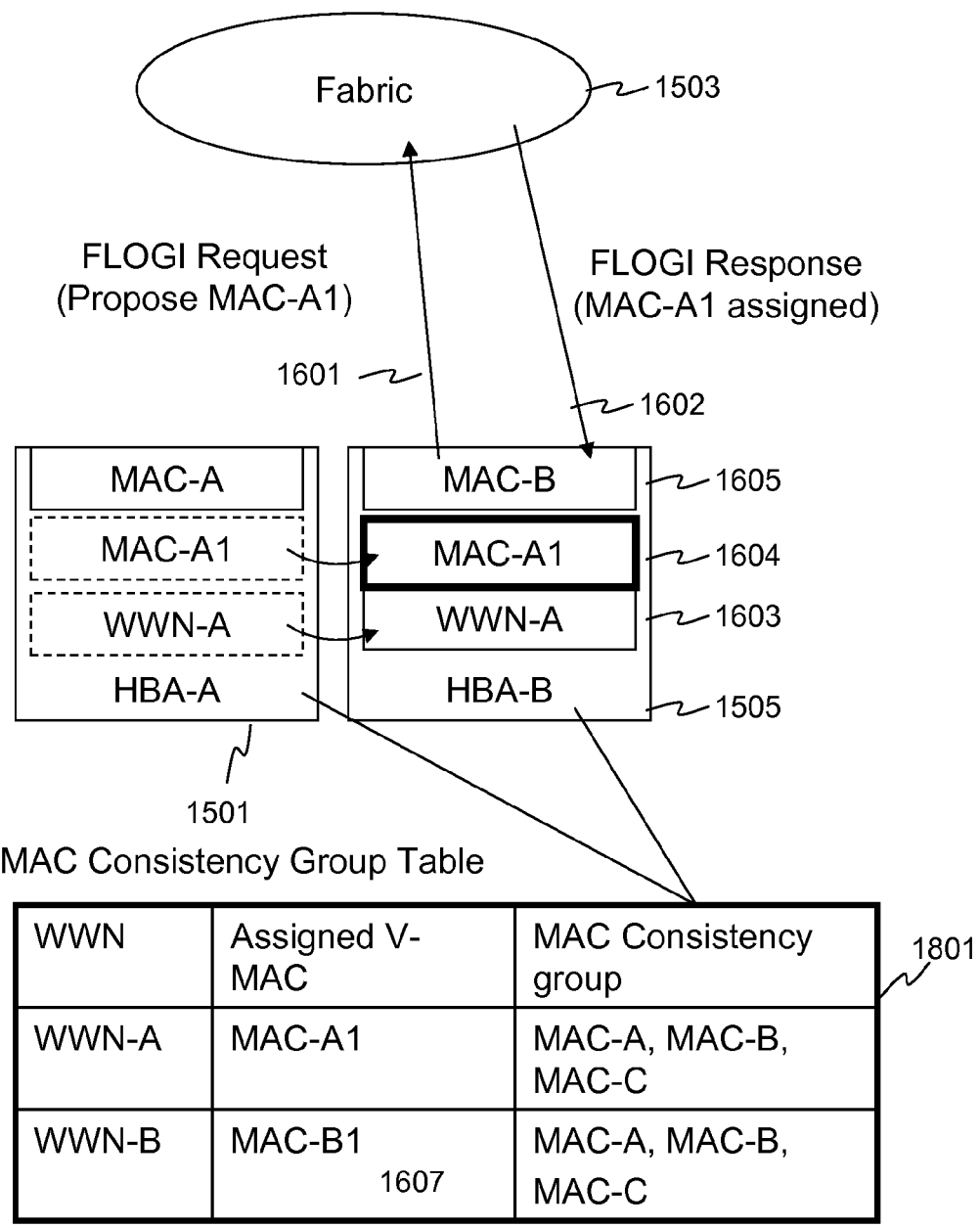
FIG. 18 shows another exemplary configuration, wherein that multiple HBAs share the MAC Consistency Group Table.

FIG. 18 shows another exemplary configuration, wherein that multiple HBAs share the MAC Consistency Group Table 1801. When the migration occurs, HBA-B 1505 will propose the assigned MAC address (MAC-A1 1604), instead of the MAC-B1 1607.

Figure 19:
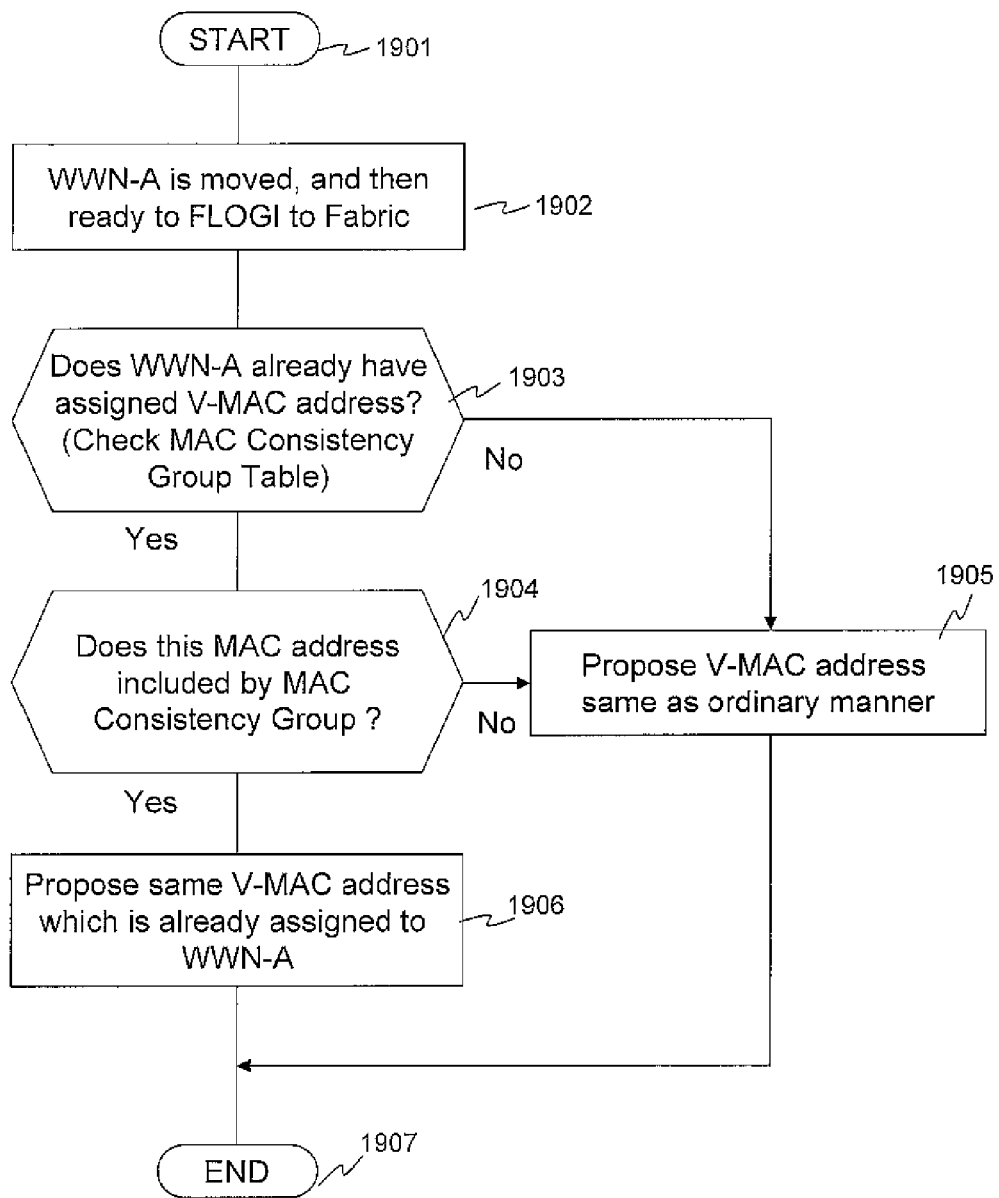
FIG. 19 illustrates an exemplary flowchart of the procedure for migrating WWN and V-MAC addresses.
Figure 20:
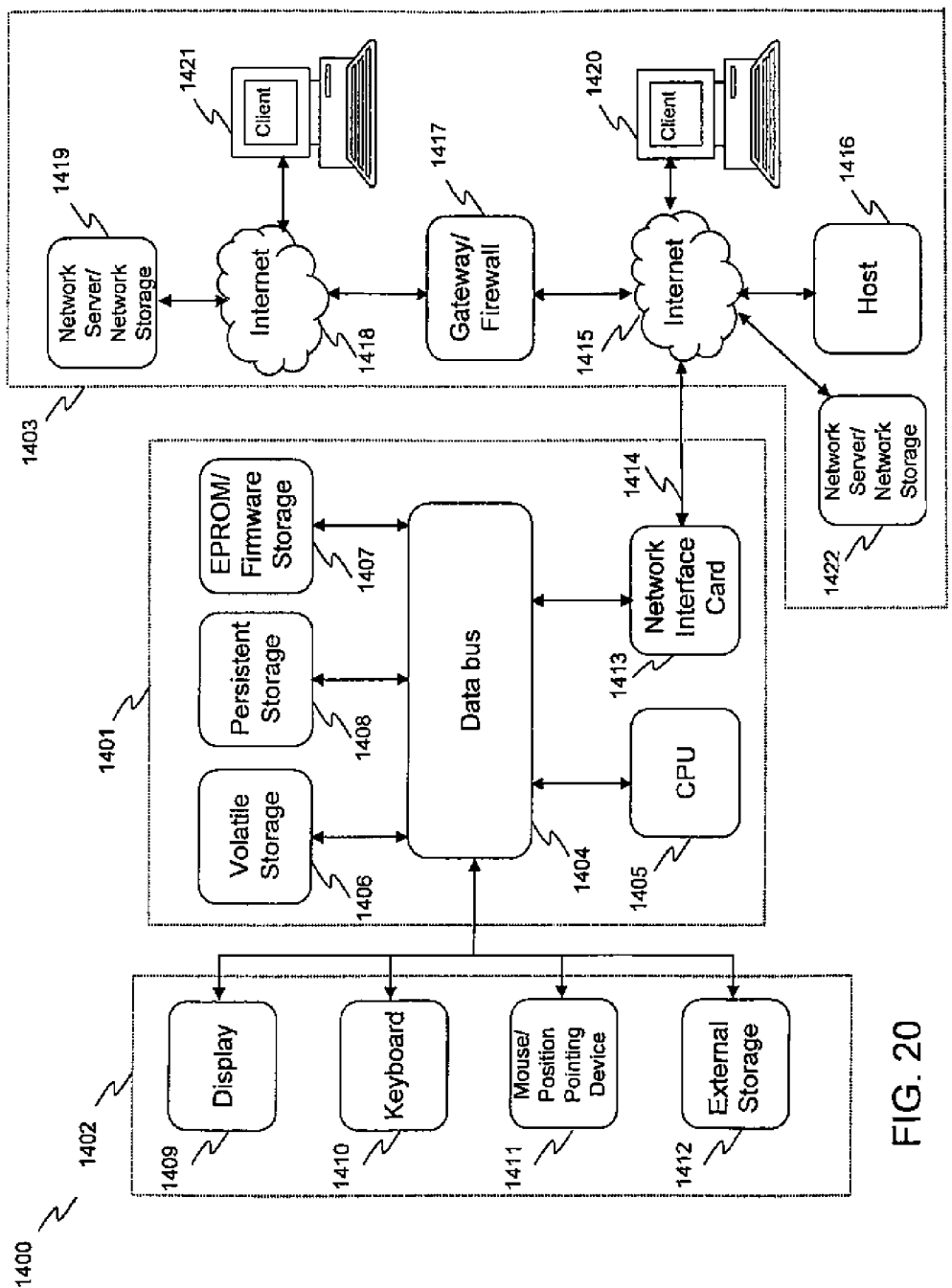
FIG. 20 illustrates an exemplary embodiment of a computer platform upon which the inventive system may be implemented.

FIG. 19 illustrates an exemplary flowchart of the above process. The operation of the process starts at step 1901. At step 1902, the HBA-B performs the move of the WWN-A address and prepares to send a FLOGI request to the Fabric. At step 1903, the HBA-B checks the MAC Consistency Group Table 1801 whether WWN-A has already been assigned a V-MAC address. If so, the operation proceeds to step 1905. Otherwise, the operation proceeds to step 1904. At step 1905, the HBA-B checks whether the MAC address is included in a MAC Consistency Group. If so, the HBA-B proposes to the Fabric in the FLOGI request the same V-MAC address, which has already been assigned to WWN-A. Otherwise, the operation proceeds to step 1904, whereupon the V-MAC address is proposed to the Fabric in an ordinary manner. The operation terminates at step 1907. The above process allows the Fabric to assign same V-MAC address to HBA-B.

Exemplary Computer Platform

FIG. 15 is a block diagram that illustrates an embodiment of a computer/server system 1400 upon which an embodiment of the inventive methodology may be implemented. The system 1400 includes a computer/server platform 1401, peripheral devices 1402 and network resources 1403.

The computer platform 1401 may include a data bus 1404 or other communication mechanism for communicating information across and among various parts of the computer platform 1401, and a processor 1405 coupled with bus 1401 for processing information and performing other computational and control tasks. Computer platform 1401 also includes a volatile storage 1406, such as a random access memory (RAM) or other dynamic storage device, coupled to bus 1404 for storing various information as well as instructions to be executed by processor 1405. The volatile storage 1406 also may be used for storing temporary variables or other intermediate information during execution of instructions by processor 1405. Computer platform 1401 may further include a read only memory (ROM or EPROM) 1407 or other static storage device coupled to bus 1404 for storing static information and instructions for processor 1405, such as basic input-output system (BIOS), as well as various system configuration parameters. A persistent storage device 1408, such as a magnetic disk, optical disk, or solid-state flash memory device is provided and coupled to bus 1401 for storing information and instructions.

Computer platform 1401 may be coupled via bus 1404 to a display 1409, such as a cathode ray tube (CRT), plasma display, or a liquid crystal display (LCD), for displaying information to a system administrator or user of the computer platform 1401. An input device 1410, including alphanumeric and other keys, is coupled to bus 1401 for communicating information and command selections to processor 1405. Another type of user input device is cursor control device 1411, such as a mouse, a trackball, or cursor direction keys for communicating direction information and command selections to processor 1404 and for controlling cursor movement on display 1409. This input device typically has two degrees of freedom in two axes, a first axis (e.g., x) and a second axis (e.g., y), that allows the device to specify positions in a plane.

An external storage device 1412 may be connected to the computer platform 1401 via bus 1404 to provide an extra or removable storage capacity for the computer platform 1401. In an embodiment of the computer system 1400, the external removable storage device 1412 may be used to facilitate exchange of data with other computer systems.

The invention is related to the use of computer system 1400 for implementing the techniques described herein. In an embodiment, the inventive system may reside on a machine such as computer platform 1401. According to one embodiment of the invention, the techniques described herein are performed by computer system 1400 in response to processor 1405 executing one or more sequences of one or more instructions contained in the volatile memory 1406. Such instructions may be read into volatile memory 1406 from another computer-readable medium, such as persistent storage device 1408. Execution of the sequences of instructions contained in the volatile memory 1406 causes processor 1405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1405 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1408. Volatile media includes dynamic memory, such as volatile storage 1406. Transmission media includes coaxial cables, copper wire and fiber optics, including the wires that comprise data bus 1404. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1405 for execution. For example, the instructions may initially be carried on a magnetic disk from a remote computer. Alternatively, a remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on the data bus 1404. The bus 1404 carries the data to the volatile storage 1406, from which processor 1405 retrieves and executes the instructions. The instructions received by the volatile memory 1406 may optionally be stored on persistent storage device 1408 either before or after execution by processor 1405. The instructions may also be downloaded into the computer platform 1401 via Internet using a variety of network data communication protocols well known in the art.

The computer platform 1401 also includes a communication interface, such as network interface card 1413 coupled to the data bus 1404. Communication interface 1413 provides a two-way data communication coupling to a network link 1414 that is connected to a local network 1415. For example, communication interface 1413 may be an integrated services digital network (ISDN) card or a modem to provide a data communication connection to a corresponding type of telephone line. As another example, communication interface 1413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1413 sends and receives electrical, electromagnetic or optical signals that carry digital data streams representing various types of information.

Network link 1413 typically provides data communication through one or more networks to other network resources. For example, network link 1414 may provide a connection through local network 1415 to a host computer 1416, or a network storage/server 1417. Additionally or alternatively, the network link 1413 may connect through gateway/firewall 1417 to the wide-area or global network 1418, such as an Internet. Thus, the computer platform 1401 can access network resources located anywhere on the Internet 1418, such as a remote network storage/server 1419. On the other hand, the computer platform 1401 may also be accessed by clients located anywhere on the local area network 1415 and/or the Internet 1418. The network clients 1420 and 1421 may themselves be implemented based on the computer platform similar to the platform 1401.

Local network 1415 and the Internet 1418 both use electrical, electromagnetic or optical signals that carry digital data streams. The signals through the various networks and the signals on network link 1414 and through communication interface 1413, which carry the digital data to and from computer platform 1401, are exemplary forms of carrier waves transporting the information.

Computer platform 1401 can send messages and receive data, including program code, through the variety of network(s) including Internet 1418 and LAN 1415, network link 1414 and communication interface 1413. In the Internet example, when the system 1401 acts as a network server, it might transmit a requested code or data for an application program running on client(s) 1420 and/or 1421 through Internet 1418, gateway/firewall 1417, local area network 1415 and communication interface 1413. Similarly, it may receive code from other network resources.

The received code may be executed by processor 1405 as it is received, and/or stored in persistent or volatile storage devices 1408 and 1406, respectively, or other non-volatile storage for later execution. In this manner, computer system 1401 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with HBA migration functionality. It is intended that the specification and examples be considered as exemplary only, with a true scope and spirit of the invention being indicated by the following claims.

What is claimed is:

1. A method for migrating a world wide name from a first host bus adaptor to a second host bus adaptor comprising:
    said first host bus adaptor receiving I/O operations from a host computer by a SCSI command and transferring the command to a storage controller coupled to a storage device, said first host bus adaptor associated with said world wide name and a MAC address;
    relocating said world wide name from said first host bus adaptor to said second host bus adaptor;
    determining, by a processor, whether or not said MAC address associated with said first host bus adaptor can be relocated to said second host bus adaptor;
    relocating said MAC address from said first host bus adaptor to said second host bus adaptor if said determining is positive;
    giving up on said MAC address relocation if said determining is negative; and
    wherein said second host bus adaptor receives I/O operations from a host computer by a SCSI command and transfers the command to a storage controller coupled to a storage device, after said second host bus adaptor is associated with said world wide name and said MAC address, if said MAC address is relocated to said second host bus adaptor.

2. The method according to claim 1,
    wherein said determining is performed by whether said MAC address is shared by other services.

3. The method according to claim 1,
    wherein said determining is performed by referring to a table including an information of whether the MAC address is included in a consistency group.

4. The method according to claim 1, further comprising:
    establishing MAC layer connection after said relocating said MAC address from said first host bus adaptor to said second host bus adaptor;
    wherein said determining is performed by whether said MAC address is shared by other services.

5. The method according to claim 4, wherein said storage devices are Hard Disk Drives and said storage controller configures said storage devices in a RAID array.

6. The method according to claim 2, wherein said world wide name and said MAC address are both unique identifiers.

7. The method according to claim 6, wherein said first and second host bus adaptor handles network operations performed under Fibre Channel protocol and Ethernet protocol, and said relocating of said world wide name is performed by NPIV technology.

8. A method for migrating a world wide name from a first host bus adaptor to a second host bus adaptor comprising:

said first host bus adaptor receiving I/O operations from a host computer by a SCSI command and transferring the command to a storage controller coupled to a storage device, said first host bus adaptor associated with said world wide name and a MAC address;

determining, by a processor, whether or not said MAC address associated with said first host bus adaptor can be relocated to said second host bus adaptor;

relocating said world wide name from said first host bus adaptor to said second host bus adaptor if said determining is positive;

relocating said MAC address from said first host bus adaptor to said second host bus adaptor if said determining is positive;

giving up on said MAC address relocation if said determining is negative; and wherein said second host bus adaptor receives I/O operations from a host computer by a SCSI command and transfers the command to a storage controller coupled to a storage device, after said second host bus adaptor is associated with said world wide name and said MAC address, if said MAC address is relocated to said second host bus adaptor.

9. The method according to claim 8,
wherein said determining is performed by whether said MAC address is shared by other services.

10. The method according to claim 8,
wherein said determining is performed by referring to a table including an information of whether the MAC address is included in a consistency group.

11. The method according to claim 8, further comprising:
establishing MAC layer connection after said relocating said MAC address from said first host bus adaptor to said second host bus adaptor;
wherein said determining is performed by whether said MAC address is shared by other services.

12. The method according to claim 11, wherein said storage devices are Hard Disk Drives and said storage controller configures said storage devices in a RAID array.

13. The method according to claim 9, wherein said world wide name and said MAC address are both unique identifiers.

14. The method according to claim 13, wherein said first and second host bus adaptor handles network operations performed under Fibre Channel protocol and Ethernet protocol, and said relocating of said world wide name is performed by NPIV technology.

* * * * *